United States Patent [19]
Carmien

[11] Patent Number: 5,262,113
[45] Date of Patent: Nov. 16, 1993

[54] METHOD OF MAKING A PLASTIC ENCASED TOOL COMPONENT HAVING A LIGHTWEIGHT HOLLOW CORE

[76] Inventor: Joseph A. Carmien, 525 N. Maple Dr., Beverly Hills, Calif. 90210

[21] Appl. No.: 926,750

[22] Filed: Aug. 6, 1992

[51] Int. Cl.⁵ ............................................. B29C 33/76
[52] U.S. Cl. .................................. 264/257; 264/271.1; 264/317
[58] Field of Search ............... 264/257, 259, 271.1, 264/279, 317, DIG. 4

[56] References Cited

U.S. PATENT DOCUMENTS

| | | | |
|---|---|---|---|
| 2,517,902 | 8/1950 | Luebkeman | 264/317 |
| 3,762,453 | 10/1973 | Marrow et al. | 264/46.4 |
| 4,424,183 | 1/1984 | Nelson | 264/317 |
| 4,570,988 | 2/1986 | Carmien | 294/57 |
| 4,605,254 | 8/1986 | Carmien | 16/110 R |
| 4,743,481 | 5/1988 | Quinlan et al. | 264/317 |

FOREIGN PATENT DOCUMENTS

| | | | |
|---|---|---|---|
| 2555098 | 5/1985 | France | 264/279 |
| WO84/03065 | 8/1984 | PCT Int'l Appl. | 264/317 |
| 2093398 | 9/1982 | United Kingdom | 264/279 |

*Primary Examiner*—Jay H. Woo
*Assistant Examiner*—Robert B. Davis
*Attorney, Agent, or Firm*—Kelly, Bauersfeld & Lowry

[57] ABSTRACT

An improved method is provided for the manufacture of tool components and the like, of a type having a hollow core disposed within an outer encasement of molded plastic material. A hollow core for the tool component is filled with a flowable filler material such as small steel pellets prior to placement of the core into a mold cavity for injection mold formation of the outer encasement. During the molding step, the filler material provides a substantially rigid structural backstop which enables a core of lightweight construction to withstand typical injection molding parameters. The thus-formed tool component is removed from the mold, and some or all of the filler material is drained from the core through an open port. In one embodiment the tool component includes a lightweight hollow tool handle; in another embodiment, the tool component includes the head of a deadblow hammer with a portion of the filler material retained therein.

24 Claims, 4 Drawing Sheets

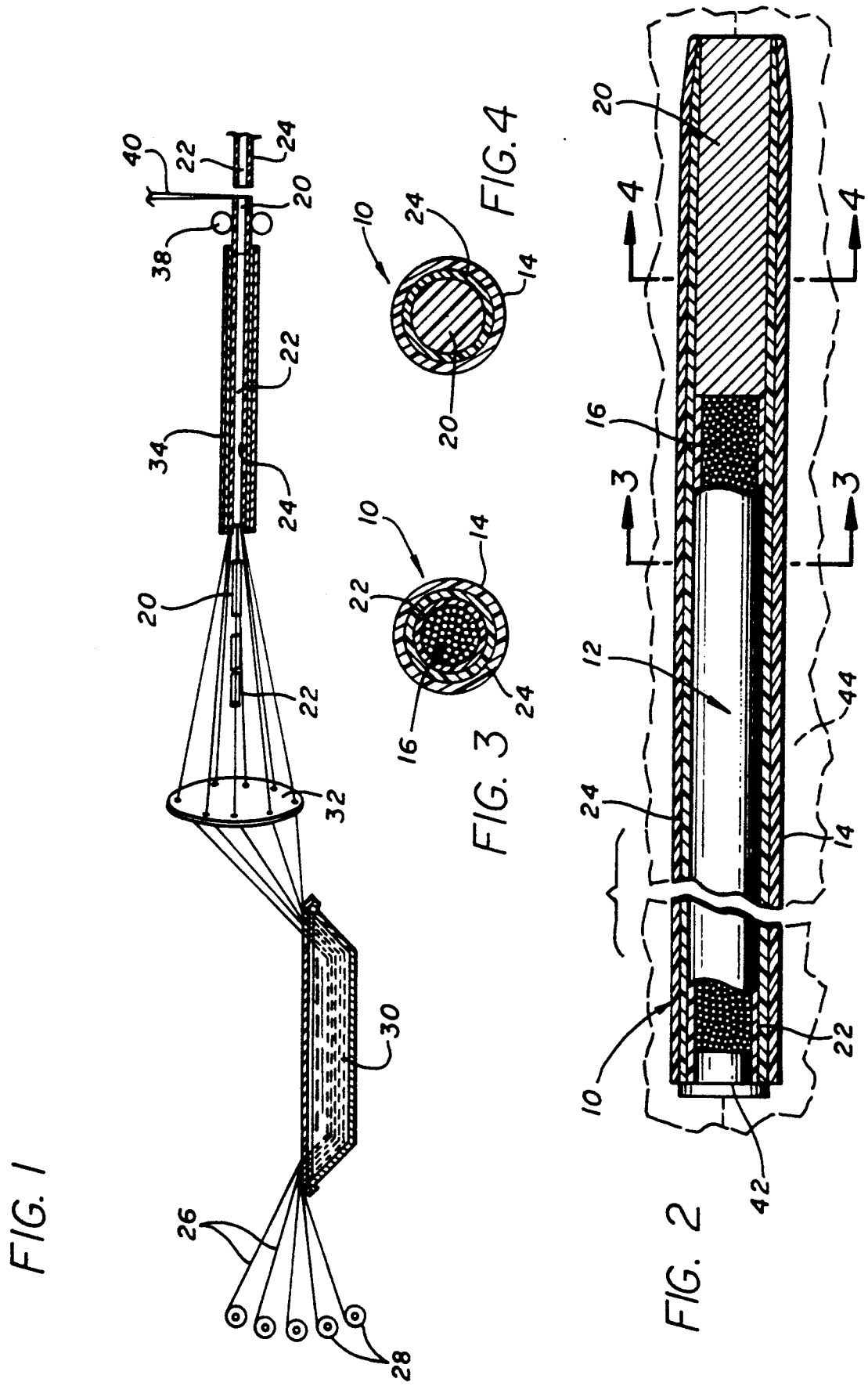

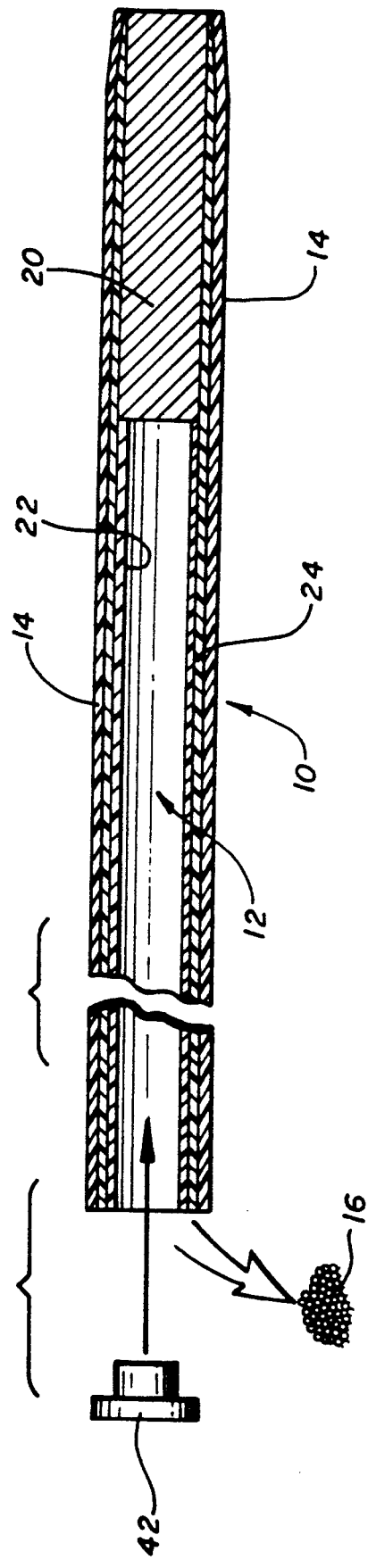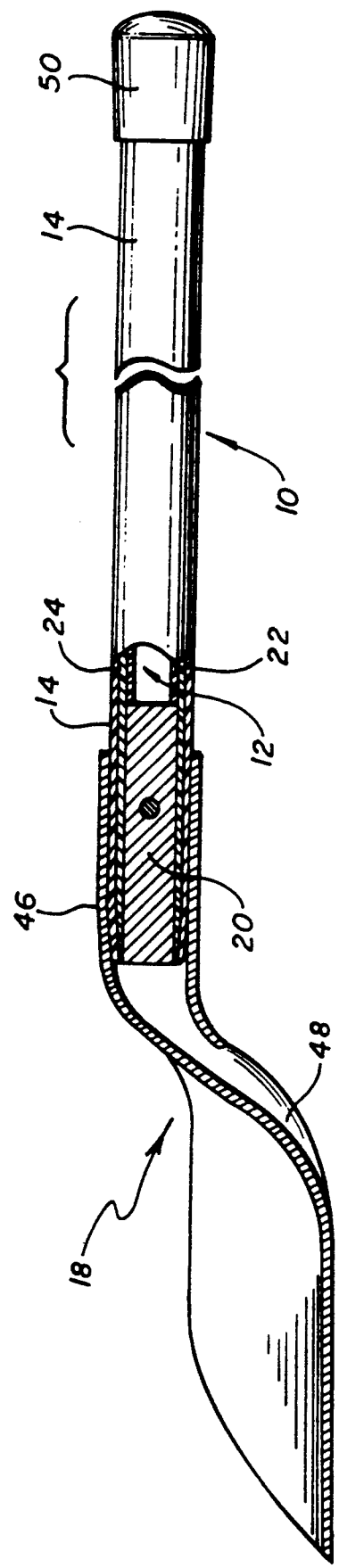

FIG. 7
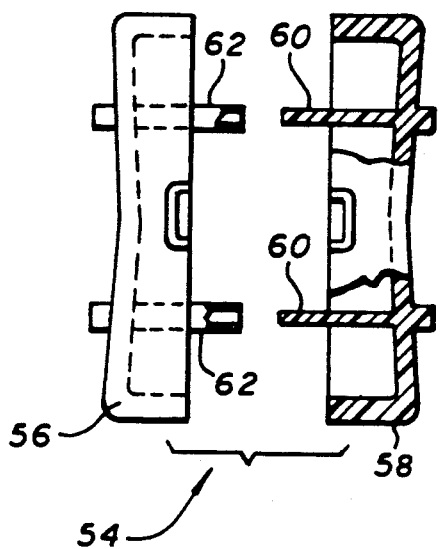
FIG. 8
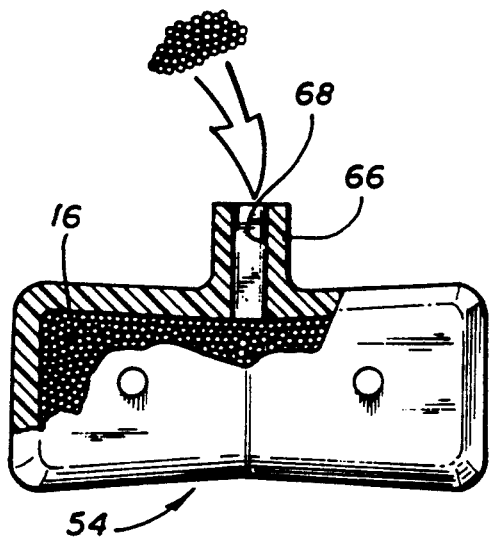
FIG. 9
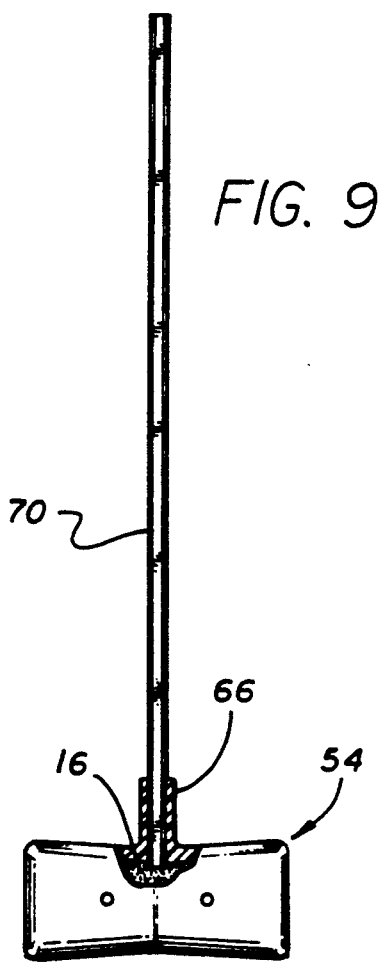
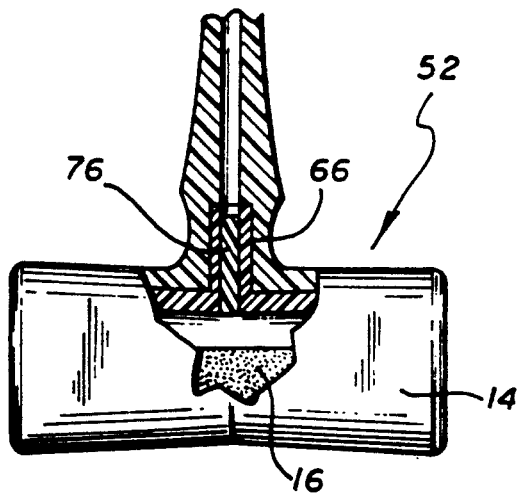
FIG. 13

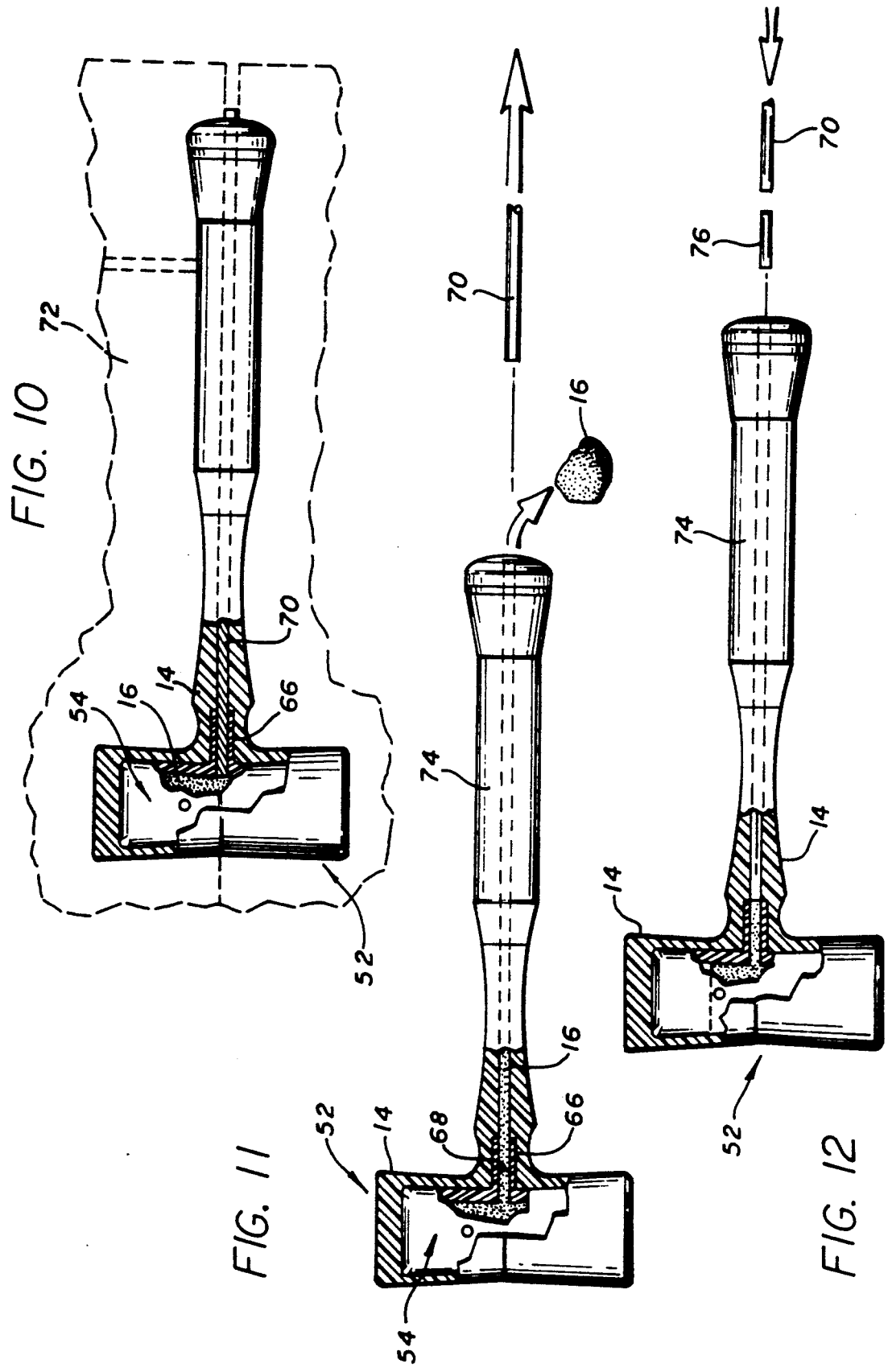

METHOD OF MAKING A PLASTIC ENCASED TOOL COMPONENT HAVING A LIGHTWEIGHT HOLLOW CORE

BACKGROUND OF THE INVENTION

This invention relates generally to improvements in manufacturing processes and methods used to produce plastic encased tool components and the like. More particularly, this invention relates to an improved method of making plastic molded tool components having a lightweight hollow core, wherein the hollow core is structurally reinforced during molding processes to prevent damage thereto.

A variety of plastic encased tool components are generally known in the art, wherein a skeletal core member is contained within a resilient outer encasement or cladding of molded plastic material or the like. The tool component is produced by placing the skeletal core member into a mold cavity which is then filled with a selected thermoplastic molding compound under suitable conditions of heat and pressure. The plastic material is permitted to cure, followed by removal of the plastic encased tool component from the mold cavity. Examples of such plastic encased tool components include elongated tool handles, plastic-faced hammers and mallets, etc.

In the production of tool components of this general type, the skeletal core member must have sufficient structural integrity to withstand the pressures and temperatures encountered in a typical injection molding environment. That is, the core member must be able to retain its structural size and shape throughout the injection molding process, to prevent production of defective tool components. In the past, skeletal core members of solid cross-section have been commonly used in the manufacture of plastic encased tool components. However, since the cost of such tool components is primarily attributable to the cost of materials, it is desirable to reduce or minimize the material used in the skeletal core member to the extent possible without sacrificing the requisite strength and stiffness. In this regard, mere reduction in the cross-sectional size of a solid core member is ineffective to reduce materials cost, since additional molded plastic encasement material is required to form the finished tool component.

Hollow skeletal core structures have been proposed for use in the manufacture of plastic encased tool components. A hollow core member beneficially reduces the material cost in the finished tool component, without requiring the use of additional molded plastic encasement material. Moreover, a hollow skeletal core reduces the weight of the finished tool component, resulting in a lightweight tool product which can be especially desirable in certain applications. However, despite the hollow construction of the skeletal core member, a substantial amount of core member material has still been required in order to provide the core member with the necessary structural integrity to withstand injection molding processes.

There exists, therefore, a need for further improvements in manufacturing processes for making plastic encased tool components, wherein a hollow core member constructed from substantially minimum material quantities is contained within a resilient outer encasement of molded thermoplastic material or the like. The present invention fulfills this need and provides further related advantages.

SUMMARY OF THE INVENTION

In accordance with the invention, an improved method is provided for making a plastic encased tool component having a lightweight hollow core. The method comprises the steps of filling the hollow core with a flowable filler material which provides a substantially rigid structural backstop to maintain the size and shape integrity of the core when it is placed into a mold cavity for injection mold formation of a resilient outer encasement or cladding. Some or all of the filler material is then drained from the hollow core. In one form, the plastic encased tool component comprises an elongated tool handle, for example, for a shovel. In another form, the tool component comprises the head of a hammer or mallet, which may have a portion of the filler material retained therein to form a nonrecoil hammer.

More particularly, in one preferred form of the invention, the hollow core comprises an elongated and lightweight plastic tube filled with the flowable filler material, such as small pellets of stainless steel or the like. End cap means are provided at opposite ends of the core tube to retain the filler material therein, when the core tube is placed into a cavity of an injection mold. In a preferred form, the core tube may be co-formed by a pultrusion process within a surrounding reinforcement sheath of fiber-resin material as described, for example, in U.S. Pat. Nos. 4,570,988 and 4,605,254, which are incorporated by reference herein.

Within the injection mold, flowable thermoplastic encasement material is injected into the mold cavity to fill the space surrounding the hollow core, under suitable conditions of heat and pressure to form the molded plastic outer encasement. During this step, the filler material within the core tube provides a structural backstop to maintain core tube shape integrity. When the thus-formed tool component is removed from the mold following solidification of the plastic material, the end cap means can be opened to permit the filler material to be poured from the core tube. The filler material may be reused.

In an alternative preferred form, the hollow core comprises a lightweight cylindrical head for a hammer or mallet. The hollow core head is filled with the flowable filler material before placement into an injection mold, and encasement of the head within the molded plastic outer encasement material. A cap or plug on the core head is then removed to open an access port and thereby permit some or all of the flowable filler material to be drained therefrom. When the filler material comprises small pellets of steel or the like, a portion of the filler material may be retained within the core head to provide the resultant hammer with deadblow or nonrecoil characteristics. A seal plug is seated within the access port in the core head to retain the residual filler material therein.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a schematic representation of a pultrusion process adapted to form a hollow core tube for use in making a plastic encased tool component, in accordance with the method of the present invention;

FIG. 2 is an enlarged fragmented and longitudinal sectional view illustrating a hollow core tube produced in accordance with FIG. 1, with a plastic outer encasement formed thereon;

FIG. 3 is a transverse sectional view taken generally on the line 3—3 of FIG. 2;

FIG. 4 is a transverse sectional view taken on the line 4—4 of FIG. 2;

FIG. 5 is a fragmented and partially exploded sectional view illustrating the plastic encased tool component of FIG. 2, and depicting removal of a flowable filler material therefrom;

FIG. 6 is a fragmented sectional view depicting the plastic encased tool component of FIG. 5, illustrating exemplary use thereof as a tool handle for a shovel;

FIG. 7 is an exploded plan view, shown partially in section, illustrating a lightweight hollow core head in accordance with an alternative preferred form of the invention;

FIG. 8 is a front elevational view, shown partially in vertical section, illustrating filling of the core head with a flowable filler material;

FIG. 9 is a front elevational view, shown partially in vertical section, illustrating the hollow core head of FIG. 8 in assembled relation which a skeletal core pin;

FIG. 10 is a front elevational view, shown partially in vertical section, illustrating the core head and core pin of FIG. 9 within an injection mold, with a molded plastic outer encasement formed thereon;

FIG. 11 is a front elevational view, shown partially in vertical section, similar to FIG. 10 and illustrating removal of a portion of the filler material from the hollow core head;

FIG. 12 is a front elevational view similar to FIG. 11, and illustrating a seal plug for use in closing an access port in the core head; and FIG. 13 is an enlarged fragmented front elevational view, shown partially in vertical section, illustrating the seal plug mounted within the access port on the core head.

DETAILED DESCRIPTION OF THE PREFERRED EMBODIMENTS

As shown in the exemplary drawings, an improved method is provided for making a plastic encased tool component, such as a tool handle referred to generally by the reference numeral 10 in FIGS. 2-6. The tool component 10 includes a lightweight hollow core 12 contained within an outer cladding or encasement 14 of molded plastic material or the like. During formation of the outer encasement 14, the hollow core 12 is substantially filled and structurally backstopped by a flowable filler material 16 (FIGS. 2 and 3) to enable the otherwise lightweight core 12 to withstand injection molding pressure and temperature conditions.

The present invention permits use of a hollow core 12 constructed from a minimum mass of lightweight material, such as a molded or extruded plastic tubular shell, wherein the hollow core 12 may be constructed with inadequate structural strength and rigidity to withstand compressive pressures, etc., applied thereto in the course of injection molding processes to form the outer encasement 14. More particularly, the hollow core 12 defines a generally tubular or cylindrical thin-walled structure with an open interior volume. During injection molding, this interior volume is substantially completely filled by the filler material 16, selected to provide a rigid structure backstop which reinforces and retains the shape integrity of the core 12. The filler material is adapted for removal, in whole or in part, from the hollow core of the tool component subsequent to molded formation of the outer encasement 14, thereby providing a lightweight tool component constructed from a comparative minimum of constituent materials.

In one preferred form as illustrated in FIGS. 2-6, the plastic encased tool component comprises an elongated and lightweight tool handle 10 for use, for example, in a shovel 18 (FIG. 6). The illustrative hollow core 12 is formed, as depicted in FIG. 1, by a pultrusion process wherein an alternating sequence of solid core segments 20 and hollow core tubes 22 are co-formed within a fiber-resin outer reinforcement sheath 24.

More particularly, with reference to FIG. 1, a plurality of fibers 26 are drawn from a corresponding series of spools 28 through a resin bath 30. The resin-coated fibers are drawn further through a carding disk 32 into die tube 34 having a suitable heating element. The resin-coated fibers are drawn or pultruded through the die tube 34 by tractor type puller elements 38, in association with the alternating sequence of solid core segments 20 and hollow core tubes 22. The heating element of the die tube suitably heats and cures the resin, to form the fiber-resin sheath 24 disposed concentrically about the core elements 20, 22. A cutting device 40 is provided at a position downstream from the puller elements 38 for cutting the resultant product into a succession of hollow cores 12 having one open end. This process for constructing elongated hollow tool handles is described in more detail in U.S. Pat. Nos. 4,570,988 and 4,605,254, which are incorporated by reference herein.

The hollow interior of each core tube 22 is filled with the flowable filler material 16. One end of the core tube 22 is closed by means of the adjacent solid core segment 20. The opposite, open end of the core 12 is plugged by a removable end cap 42. The filler material 16 is selected to provide substantial structural or backstop reinforcement to the otherwise lightweight and preferably thin-walled core tube 22, to permit the core tube to withstand injection molding conditions, as will be described. While the specific filler material 16 may vary, a preferred material comprises small pellets of stainless steel shot or the like, having a diametric size on the order of 0.005 inch.

The hollow core 12, containing the filler material 16, is placed into a mold cavity of an injection mold 44 (FIG. 2). Appropriate locator pins (not shown) are typically provided to support the core 12 in a predetermined spaced relation with surfaces of the surrounding mold 44, thus defining a space into which a selected plastic molding material may be injected under appropriate conditions of temperature and pressure. The plastic molding material is permitted to cure, thus defining the plastic outer encasement 14 for the tool component. Once again, a variety of plastic encasement materials may be used of a type known in the art in the construction of plastic encased tool components. Pressure and temperature conditions for such materials run typically on the order of 3,000 psi and 300 to 450 degrees F. During the injection molding process, the filler material 16 effectively retains the lightweight core tube 22 against compressive deformation or other damage.

When the plastic encasement 14 is suitably cured, the tool component 10 is removed from the mold 44. The end cap 42 is then removed from the end of the core tube 22, as viewed in FIG. 5, thereby permitting the filler material 16 to be drained from the core tube interior. This filler material 16 can be reused in the course of injection molding steps for subsequent tool components.

The resultant tool handle 10, as shown in FIG. 6, may be used as the elongated handle for a shovel 18, or other suitable implement. As shown, a forward end of the tool handle 10, containing the solid core segment 20, is mounted within the open neck 46 of a shovel head 48. The hollow core 12 of the tool handle projects upwardly or rearwardly from the shovel head 48, and may conveniently be closed by a decorative end cap 50. Importantly, the hollow core 12 has a lightweight construction, suitably reinforced by the fiber-resin sheath 24, and contained within the plastic outer encasement 14.

FIGS. 7-13 illustrate an alternative preferred form of the invention, wherein a hollow tool component 52 comprises a plastic encased head for a hammer or mallet. In this embodiment, the head 52 again includes a lightweight hollow core 54 filled with the flowable filler material 16 during formation of a resilient outer encasement 14. Some or all of the filler material 16 is removable from the hollow core 54 subsequent to formation of the plastic encasement 14. In one form, a portion of the filler material 16 remains within the head 54 to provide the hammer with so-called deadblow or nonrecoil characteristics.

More particularly, as shown in FIG. 7, the hollow core 54 comprises a pair of shell-shaped core members 56 and 58 of molded lightweight plastic material or the like, and including appropriate interfitting locator pins 60 and sleeves 62 for assembly of the core members in face-to-face relation defining a hollow cylindrical interior space. These core members may be adhesively secured to each other, if desired. An open neck 66 (FIGS. 8 and 9) protrudes from one side of the assembled core members 56, 58, and defines an access port 68 for introduction of the flowable filler material 16, as viewed in FIG. 8. An elongated core pin 70 (FIG. 9) is then positioned with one end seated within the access port 68, to protrude from the hollow core 54 as a skeletal member for a hammer handle.

The assembled core 54 and core pin 70 are placed within an injection mold 72, as shown in FIG. 10, followed by introduction of the plastic encasement material under suitable injection molding conditions. The encasement material is permitted to cure, thereby defining the plastic molded encasement 14.

The resultant hammer is separated from the mold 72, and the core pin 70 withdrawn from the molded plastic handle 74 to open the access port 68 in the hollow core 54 (FIG. 11). Some or all of the filler material 16 can then be drained from the hollow core 54, to provide a lightweight hammer head. In a preferred form, a portion (approximately ¼ to ⅓) of the filler material 16 is retained within the hammer head, and the access port 68 is plugged and sealed by a press-fit or adhesively mounted seal plug 76, as viewed in FIGS. 12 and 13. The seal plug 76 may be pressed into place, by use of the core pin 70. The core pin 70 and filler material 16 removed from the hammer head 52 may be reused.

The present invention thus provides an improved method for making plastic encased tool components having a lightweight hollow core, wherein the hollow core is structurally backstopped and reinforced by the flowable filler material 16 during injection molding. Subsequent to injection molding of an outer encasement 14, some or all of the filler material 16 can be removed quickly and easily from the core to provide a lightweight and relatively low cost tool component.

A variety of further modifications and improvements to the invention described herein will be apparent to those skilled in the art. For example, while hollow tubular core structures are shown and described herein, it will be understood that alternative lightweight core structures defining an open interior volume to receive the filler material may be used. Accordingly, no limitation on the invention is intended by way of the foregoing description and accompanying drawings, except as set forth in the appended claims.

I claim:

1. A method of making a tool component, comprising the steps of:
  filling a hollow core member with a selected flowable filler material;
  molding an outer encasement about the exterior of said hollow core member, whereby the filler material provides a structural backstop to maintain the shape integrity of the hollow core member during said molding step;
  removing a limited portion of the filler material from said core member subsequent to said molding step; and
  sealing the hollow core member to retain a residual portion of the filer material therein.

2. The method of claim 1 wherein said filling step comprises filling the hollow core member with small rigid pellets.

3. The method of claim 1 further including the step of closing an access port formed in the core member subsequent to said filling step, and prior to said molding step, and further wherein said removing step includes reopening of said access port.

4. The method of claim 1 wherein said molding step comprises an injection molding step to form a plastic outer encasement on the core member.

5. The method of claim 1 wherein the hollow core member comprises an elongated tubular member having a resin-fiber sheath formed thereon.

6. The method of claim 1 wherein the tool component comprises a hammer.

7. A method of making a tool component, comprising the steps of:
  forming a core member defining a hollow interior space and at least one access port opening into the interior space;
  filling the interior space of the core member with a flowable filler material;
  closing the at least one access port to retain the filler material within the interior space;
  placing the core member with filler material therein into a mold cavity;
  injecting a plastic material into the mold cavity to form a resilient outer encasement on the core member, and allowing the plastic material to cure to form the tool component;
  removing the tool component from the mold cavity;
  opening the access port in the core member and removing a limited portion of the filler material therefrom; and retaining a residual portion of the filler material within the core member.

8. The method of claim 7 wherein the core member comprises a thin-walled tube.

9. The method of claim 7 wherein the hollow core member comprises an elongated tubular member having a resin-fiber sheath formed thereon.

10. The method of claim 7 wherein the tool component comprises a hammer.

11. The method of claim 7 wherein the filler material comprises solid pellets.

12. The method of claim 11 wherein the solid pellets have a diametric size on the order of 0.005 inch.

13. The method of claim 7 further including the step of re-closing the access port after the limited portion of the filler material has been removed from the core member.

14. A method of making a hollow article of molded plastic, comprising the steps:
 filling a hollow core member with a flowable filler material;
 molding a plastic encasement about the core member, whereby the filler material provides a structural backstop to maintain the shape integrity of the core member during said filling step;
 removing a limited portion of the filler material from the core member subsequent to said molding step and then sealing the core member to retain a residual portion of the filler material therein.

15. The method of claim 14 wherein the core member comprises a thin-walled hollow shell.

16. The method of claim 14 wherein the filler material comprises solid pellets.

17. A method of making a tool handle, comprising the steps of:
 forming a hollow core member defined by a cylindrical solid core segment and a hollow core tube disposed end-to-end in generally coaxial relation within a resin-fiber sheath, said core tube defining a hollow interior having one open end and an opposite end closed by the solid core segment;
 filling the hollow interior of the core tube with solid pellets;
 injection molding a plastic outer encasement onto said core member, whereby the solid pellets provide a structural backstop to maintain the shape integrity of said core tube during said molding step; and
 removing the solid pellets from said core tube subsequent to said molding step.

18. The method of claim 17 further including the step of capping the open end of said core tube subsequent to filling the interior thereof with said solid pellets, said removing step including the step of uncapping said core tube open end.

19. A method of making a hammer, comprising the steps of:
 forming a hollow core head defining a hollow interior and an open access port;
 filling the hollow interior of the core head with a solid flowable filler material;
 injection molding a plastic outer encasement onto said core head to define a unitary hammer head and handle, whereby the filler material provides a structural backstop to maintain the shape integrity of said core head during said molding step; and
 removing at least a portion of the filler material from said core head subsequent to said molding steps.

20. The method of claim 19 wherein said removing step comprises removing a limited portion of said filler material from said core head and then closing said access port to retain a portion of the filler material within said core head.

21. The method of claim 19 further including the steps of closing the access port subsequent to filling the core head with said filler material and before said molding step, said removing step including opening said access port.

22. The method of claim 21 wherein the step of closing said access port includes inserting an elongated core pin into said access port, whereby the core pin defines a skeletal core member for the hammer handle, said removing step including withdrawing the core pin from said handle to open the access port.

23. The method of claim 22 further including the step of sealing the access port subsequent to said removal step.

24. The method of claim 17 wherein the solid pellets have a diametric size on the order of 0.005 inch.

* * * * *